United States Patent
Zhao et al.

(10) Patent No.: US 8,213,425 B2
(45) Date of Patent: Jul. 3, 2012

(54) METHOD FOR MATCHING INITIAL REQUEST MESSAGE IN THE IP MULTIMEDIA SUBSYSTEM SERVICE TRIGGERING PROCESS

(75) Inventors: Jingwen Zhao, Shenzhen (CN); Zhenwu Hao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 322 days.

(21) Appl. No.: 12/667,878

(22) PCT Filed: Nov. 28, 2007

(86) PCT No.: PCT/CN2007/003355
§ 371 (c)(1),
(2), (4) Date: Jan. 6, 2010

(87) PCT Pub. No.: WO2009/009934
PCT Pub. Date: Jan. 22, 2009

(65) Prior Publication Data
US 2010/0183007 A1    Jul. 22, 2010

(30) Foreign Application Priority Data
Jul. 17, 2007 (CN) .......................... 2007 1 0130278

(51) Int. Cl.
*H04L 12/28* (2006.01)
*H04L 12/56* (2006.01)
(52) U.S. Cl. ....................................................... 370/389
(58) Field of Classification Search .................. 370/351, 370/352, 389
See application file for complete search history.

(56) References Cited

U.S. PATENT DOCUMENTS

| 7,180,912 | B1* | 2/2007 | Samarasinghe | 370/474 |
| 7,209,548 | B2* | 4/2007 | Ethier et al. | 379/32.05 |
| 7,586,903 | B2* | 9/2009 | Song et al. | 370/352 |
| 2006/0136546 | A1* | 6/2006 | Trioano et al. | 709/203 |
| 2006/0268835 | A1* | 11/2006 | Hyotylainen et al. | 370/352 |
| 2007/0088836 | A1* | 4/2007 | Tai et al. | 709/227 |
| 2008/0307518 | A1* | 12/2008 | Holtmanns et al. | 726/12 |

FOREIGN PATENT DOCUMENTS

| CN | 1953390 A | 4/2007 |
| EP | 1760983 A1 | 3/2007 |
| GB | 2432748 A | 5/2007 |
| JP | 4020033 A | 1/1992 |

OTHER PUBLICATIONS

Rosenburg, J., et al, "SIP: Session Initiation Protocol," http://www.ietf.org/rfc/rfc3261.txt, Jun. 2002, 1-236, The Internet Society.

* cited by examiner

*Primary Examiner* — Ayaz Sheikh
*Assistant Examiner* — Blanche Wong

(57) ABSTRACT

A method for matching initial request messages in the IP multimedia subsystem service triggering process comprises: before the S-CSCF forwards an initial request message to the AS, generating a trigger request identifier uniquely and inserting the identifier into the initial request message; then forwarding the initial request message to the AS; and then the AS copies the trigger request identifier in the received message into the initial request message to be sent back; finally, the S-CSCF determines whether a received initial request message is the response to the initial request message sent to the AS by the S-CSCF previously based on the trigger request identifier, determines the corresponding relationship, and then performs the subsequent service control process. With the present invention, the requirement that the S-CSCF must correctly match the initial request message with the one sent back can be satisfied, thus guarantee the normal performance of service triggering.

17 Claims, 3 Drawing Sheets

METHOD FOR MATCHING INITIAL REQUEST MESSAGE IN THE IP MULTIMEDIA SUBSYSTEM SERVICE TRIGGERING PROCESS

CROSS REFERENCE RELATED APPLICATIONS

This application is a national phase of PCT/CN2007/003355 filed Nov. 28, 2007, which claims priority to China Application Serial No. 200710130278.0, filed Jul. 17, 2007, both of which are entirely incorporated herein by reference.

TECHNICAL FIELD

The present invention relates to the communication field, and more specifically to a method for matching the initial request message in the IP multimedia subsystem service triggering process.

BACKGROUND OF THE RELATED ART

The Internet Protocol (IP) Multimedia Core Network Subsystem (IMS) is an IP-based network framework offered by the 3$^{rd}$ Generation Partner Project (3GPP), and the IMS constructs an open and flexible service environment supporting the multimedia applications and offering plentiful multimedia services for the users.

In the IMS service system, the control layer is separated from the service layer, and the control layer only offers the necessary functions such as triggering, routing and charging for the service layer, rather than the specific services, while the services are totally offered by the service layer. The service triggering and control function in the control layer is implemented by the Serving Call Session Control Function (S-CSCF), and the service layer consists of a series of Application Servers (AS) which provide the specific services. The control layer (S-CSCF) controls the service triggering according to the user's subscription data and executes services on the AS, and thereby implements functions of services.

FIG. 1 is an illustration of the service triggering process, in which the service triggering process relates to the following IMS network elements: S-CSCF 101, Home Subscriber Server (HSS) 102 and AS 103.

When S-CSCF 101 receives the user registration request message or an initial request for termination or origination from an unregistered user, it downloads the service configuration data from HSS 102 through the Cx interface, and the service configuration data comprise the service-related initial filter criteria including the information such as the service triggering point, AS identifier and the priority of each initial filter criterion.

When S-CSCF 101 receives a call-in dialog establishment request, it starts a SIP dialog, creates the service point trigger from the request message, and match with the filter criteria respectively according to the priorities of filter criteria, if the match is successful, it forwards the request message to AS 103 corresponding to the filter criteria through the IMS Service Control Interface (ISC). The AS 103 executes the service logic process and after that, it sends the request message back to S-CSCF 101 through the ISC. The S-CSCF 101 continues the subsequent service triggering process and constructs the call-out request if there are no available filter criteria and forwards the request out according to the route criteria.

In the aforementioned service triggering process, in order to make the S-CSCF module able to identify that the initial request sent back to the S-CSCF by the AS is the response to the initial request sent to the AS by the S-CSCF, and determine the corresponding original dialog, in which the original dialog identifier (ODI) is introduced, and the S-CSCF module should make sure that the value selected for the ODI is unique, so as to make it uniquely identify the original dialog corresponding to the initial request. The ODI can also be used in the standalone transaction request without establishing the SIP dialog to identify that the initial request sent back to the S-CSCF by the AS is the response to the initial request sent to the AS by the S-CSCF module.

FIG. 2 is a flow chart of matching the initial request message sent back in the service triggering process in the prior art, and it describes the process of the S-CSCF module using the ODI to match the initial request message sent back by the AS with the original SIP dialog.

S201, the S-CSCF module receives a call-in dialog establishment request;

S202, the S-CSCF module starts a SIP dialog and generates an ODI which uniquely identifies the dialog;

S203, the S-CSCF module executes the service control logic and matches the request with the initial filter criteria according to the priorities of the filter criteria. If the request matches with one initial filter criterion, it executes the service triggering process;

S204, the S-CSCF module inserts the ODI into the request and forwards the request message including the ODI to the AS;

S205, after the AS executes the service process logic, it copies the ODI into the dialog establishment request message to be sent back;

S206, the AS sends the dialog establishment request message including the ODI back to the S-CSCF module;

S207, the S-CSCF module determines that the request is the response to the dialog establishment request message sent to the AS by the S-CSCF previously according to the ODI in the request message sent back, and determines its corresponding original dialog;

S208, the S-CSCF module continues to execute the subsequent service control logic and matches the request with the subsequent filter criteria with relatively low priorities. If there are matched initial filter criteria, it re-executes the service triggering process S203, and in this process, it uses the ODI generated in S201 to identify this triggering request;

S209, if there are no suitable initial filter criteria, the S-CSCF module sends the call-out request based on the route policy.

From the above process, it can be seen that in each service triggering in one session, the S-CSCF module uses the same ODI to identify the initial request message sent to the AS, and uses this identifier to determine that the initial request message sent by the AS is the response to the initial request message sent to the AS by the S-CSCF module previously, and obtains the SIP dialog corresponding to the initial request sent back according to the corresponding relationship between the ODI and the original dialog, and executes the subsequent service triggering control following the position of the latest triggering.

The S-CSCF module needs to guarantee the uniqueness of the value of the ODI, and the ODI can be encoded in different ways, for instance, it can act as one character string of the user part, a parameter or one port number, of the S-CSCF module network identifier.

The process of the standalone transaction request message (such as Message service) is similar, and the only difference is that the standalone transaction request does not establish the SIP dialog.

FIG. 3 is a flow chart of the service triggering process when the AS sends several initial request message back in the prior art.

In the present embodiment, there are two initial filter criteria: the criterion X pointing to AS1 and Y pointing to AS2, and the priority of X is higher than that of Y. When AS1 only sends one initial request back, the service triggering process comprises the following steps:

S1, the S-CSCF module receives a call-in dialog establishment request 301, starts a SIP dialog and generates the ODI uniquely identifying this dialog;

S2, the S-CSCF module executes the service control logic, finds out that the request message matches with the initial filter criterion X, executes the service triggering process, inserts the ODI into the request message and forwards the request message 302 including the ODI to AS1;

S3, after AS1 executes the service processing logic, it copies the ODI into the dialog establishment request message to be sent back, and sends the request message 303 back to the S-CSCF module;

S4, the S-CSCF module determines that the request is the response to the request message sent by the S-CSCF module previously according to the ODI in the request message sent back 303, and determines the SIP dialog correspondingly initialized in S1, continues to execute the subsequent service control logic of the SIP dialog, and finds out that the request message matches with the initial filter criterion Y, executes the service triggering process, and inserts the ODI into the request message and forwards the request message 304 including the ODI to AS2;

S5, after AS2 executes the service process logic, it copies the ODI into the request message to be sent back and sends the request message 305 back to the S-CSCF module;

S6, the S-CSCF module determines that the request is the response to the request message sent by the S-CSCF module previously according to the ODI in the request message sent back 305, and determines the SIP dialog correspondingly initialized in S1, continues to execute the subsequent service control logic of the SIP dialog, and finds out that there is no suitable initial filter criteria, and then the S-CSCF module sends the call-out request 306 based on the route policy.

However, in the matching process, it finds out that the abovementioned method has probability of error due to incorrectly matching the initial request message with the initial request message sent back.

According to research, the reason of error is that, for an initial request message sent to the AS by the S-CSCF, there might be several initial request messages sent back by the AS, such as one number service, in which when the AS receives the dialog establishment request message, it determines to call two terminals simultaneously according to the service logic, in this case, there are two dialog establishment requests sent back to call two different terminals.

In said S3 in FIG. 3, if AS1 executes the service logic and determines to send two dialog establishment requests to be sent back 303 and 303a to the S-CSCF module, and both of these two dialog establishment requests to be sent back have the same ODI and correspond to the same dialog.

In said S4 in FIG. 3, the S-CSCF module processes the request message sent back 303 first, matches with the next initial filter criteria Y, and sends the request message 304 to AS2 after triggering the service. When processing the request message 303a, 303a should match with the initial filter criteria Y since it is the one sent back of 302, while in fact, after the S-CSCF module executes the 303 request message, it considers that the filter criteria Y has been executed, and takes the request message 303a as the one sent back of the request message 304 by mistake, and matches the service filter criteria following the filter criterion Y, and there is similar confusion when processing the request sent back 305 of 304.

According to the above analysis, in the current IMS service triggering process, there are defects in the method for matching the initial request message sent by the S-CSCF module to the AS with that sent back by the AS, and since it uses the ODI to match, when one AS has several initial request messages to be sent back with the same ODI, the S-CSCF cannot correctly match the initial request message sent back to the S-CSCF module by the AS with that sent to the AS by the S-CSCF, thus there is confusion in the service triggering and it will affect the normal use of services.

CONTENT OF THE INVENTION

The present invention offers a method for matching the initial request message with the one sent back in the IMS service triggering process to overcome the defects in the present IMS service triggering process, thus to meet the requirements of correctly matching the initial request message with the one sent back.

In order to solve the above technical problem, the present invention provides a method for matching initial request messages in an IMS service triggering process, comprising the following steps of:

(a) in a process of executing a service triggering, before forwarding an initial request message to an AS, a S-CSCF generating a trigger request identifier uniquely corresponding to said initial request message;

(b) said S-CSCF module inserting said trigger request identifier into said initial request message, and forwarding said initial request message to said AS;

(c) after processing, said AS copying the trigger request identifier in the received request message into an initial request message to be sent back, and sending said initial request message back to said S-CSCF module; and (d) said S-CSCF module determining that said initial request message is a response to the initial request message sent to the AS by the S-CSCF module previously according to the trigger request identifier in the received initial request message, determining an initial request sent to the AS by the S-CSCF module and an original dialog corresponding to said initial request, and then performs a subsequent service control process.

Furthermore, said initial request message is a dialog establishment request message or a standalone transaction request message.

Furthermore, said initial request message is the dialog establishment request message, and in addition to generating the trigger request identifier uniquely corresponding to said dialog establishment request message, said step (a) further comprises establishing a corresponding relationship between the trigger request identifier and the dialog establishment request message as well as between the trigger request identifier and an original dialog corresponding to said dialog establishment request message.

Furthermore, said initial request message is the standalone transaction request message, and in addition to generating the trigger request identifier uniquely corresponding to the standalone transaction request message, said step (a) further comprises establishing a corresponding relationship of the trigger request identifier and the standalone transaction request message as well as between the trigger request identifier and an original transaction corresponding to said standalone transaction request message.

Furthermore, in said step (a), the trigger request identifier established by the S-CSCF module is unique, which means different original dialogs or the initial transaction requests have different trigger request identifiers, and identifiers corresponding to the initial request messages sent by the S-CSCF module to the AS are different in different service triggering processes of a same original dialog or transaction.

Furthermore, in said step (a), said trigger request identifier is a character string of a user part, a parameter or a port number of a network identifier of the S-CSCF module.

Furthermore, in said step (a), the generated trigger request identifier is an identifier to be applied independently formed by extending an identifier of the original dialog; alternatively, said trigger request identifier is a combination of the original dialog identifier (ODI) and trigger request parameters added on a basis of the ODI so as to determine the original dialog or transaction of the request through said ODI, and further to determine a specific request message of the initial request sent to the AS by the S-CSCF module according to said trigger request parameters.

Furthermore, in said step (c), the AS has a plurality of initial request messages to be sent back; and in said step (d), the S-CSCF module determines that the initial request messages are responses to a same initial request message in one session or transaction process according to a same trigger request identifier contained in the initial request messages, and always executes a subsequent service control following a triggering point of a previous initial request message.

Furthermore, when continuing to execute the subsequent service control logic, said S-CSCF module matches said initial request message sent back with subsequent filter criteria with relatively low priorities, and if there is matching initial filter criteria, said S-CSCF module executes a process of the service triggering in step (a) again, and identifies the trigger request with a newly generated trigger request identifier; otherwise, said S-CSCF module sends a call-out request based on the route policy.

Compared with the prior art, since the present invention applies the method that the S-CSCF module uses the trigger request identifier to uniquely determine the initial request message sent to the AS by the S-CSCF module during the IMS service triggering process, it can correctly match the initial request message sent to the AS by the S-CSCF module with that sent back by the AS and guarantee the normal performance of service triggering and the normal use of the service.

PREFERRED EMBODIMENTS OF THE PRESENT INVENTION

The technical scheme of the present invention will be described in further detail in conjunction with the accompanying figures and the embodiments.

Figure 1:
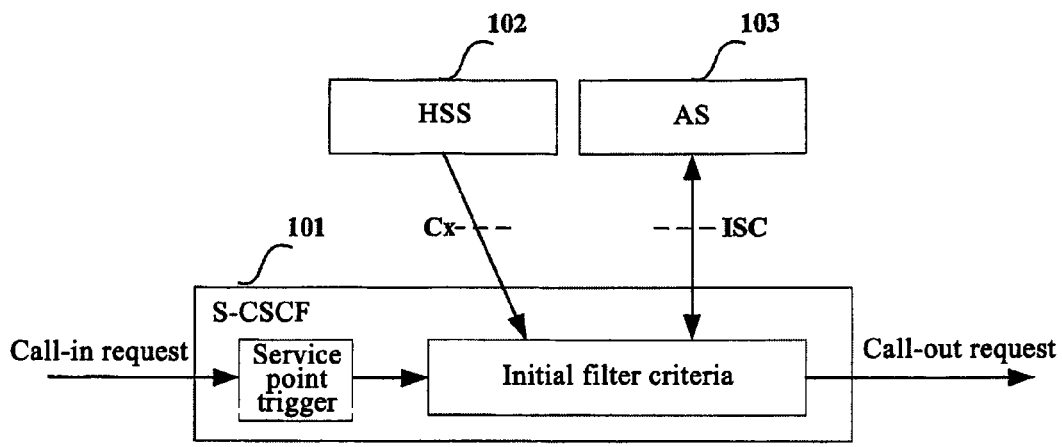
FIG. 1 is an illustration of the service triggering process.
Figure 2:
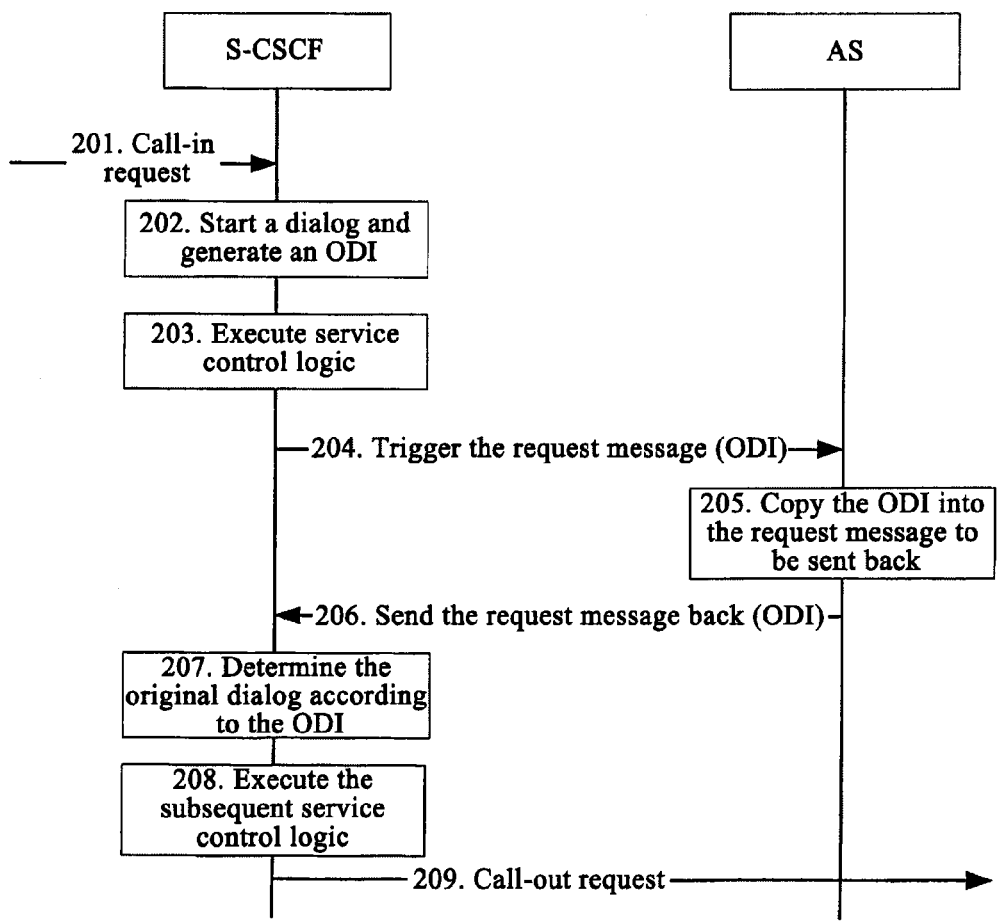
FIG. 2 is a flow chart of matching the sent-back initial request message in the service triggering process in the prior art.
Figure 3:
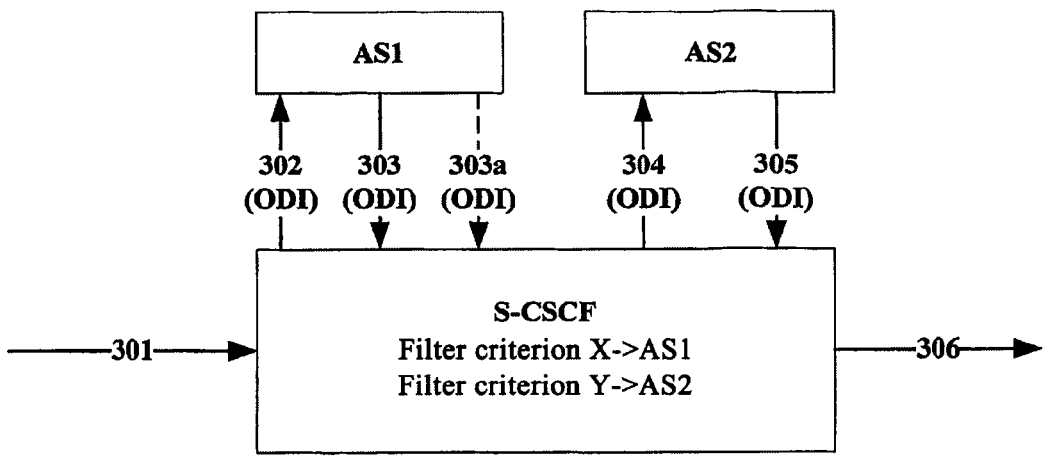
FIG. 3 is a flow chart of service triggering process when the AS sends several initial request messages back in the prior art.
Figure 4:
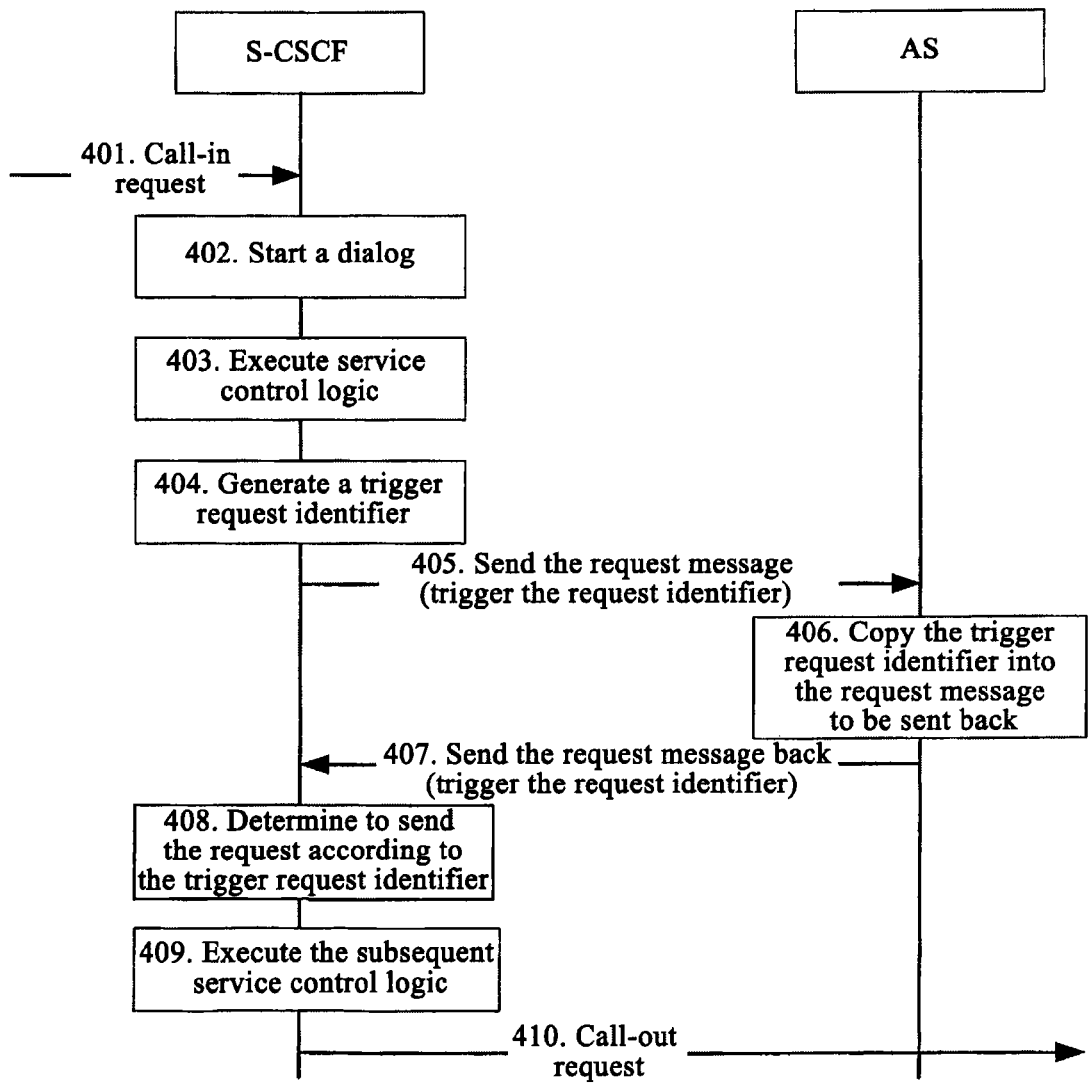
FIG. 4 is a flow chart of matching the sent-back initial request message in the service triggering process in accordance with an embodiment of the present invention.

FIG. 4 describes the process of the S-CSCF module using the improved trigger request identifier offered in the present invention to match the initial request message sent back by the AS with that sent to the AS by the S-CSCF module.

The trigger request identifier is a new concept introduced in the present invention; it is generated by the S-CSCF module and its uniqueness is guaranteed by the S-CSCF and used by the S-CSCF module only. Before the S-CSCF module forwards the initial request message (dialog establishment request or the original standalone transaction request) to the AS, it generates a trigger request identifier uniquely corresponding to the initial request message, and establishes the corresponding relationship between the trigger request identifier and the initial request message, and the original dialog or standalone transaction corresponding to the initial request message as well.

This process comprises the following steps:

S401, the S-CSCF module receives a call-in dialog establishment request;

S402, the S-CSCF module starts a SIP dialog;

S403, the S-CSCF module executes a service control logic and matches the dialog establishment request with the initial filter criteria in sequence according to the priorities of the filter criteria. If the request matches with one initial filter criterion, the S-CSCF executes the service triggering process;

S404, the S-CSCF generates a trigger request identifier uniquely corresponding to the dialog establishment request before forwarding the request to the AS, and establishes the corresponding relationship between the trigger request identifier and the dialog establishment request message, and the original dialog corresponding to the request as well;

This trigger request identifier is an identifier that can be used individually formed to extend the ODI, in other words, which may replace the ODI in the prior art in practical applications, also, the trigger request parameters which can identify this dialog can be added on the basis of the ODI, thus determine the original dialog corresponding to the initial request and the specific request message of the initial request sent to the AS by the S-CSCF module with the combination of the ODI and the trigger request parameters.

Similar to the prior art, the trigger request identifier may be one character string of the user part of the S-CSCF module network identifier (such as sip:xxyyzz@scscf.example.xom), or the parameters of the S-CSCF module network identifier (sip:example.xom;tri=xxyyzz), or the port number of the S-CSCF module network identifier (sip:scscf.example.xom:xxyyzz) and it is transferred by using the SIP route mechanism.

S405, the S-CSCF module inserts the trigger request identifier into the dialog establishment request message, and forwards the request message including the trigger request identifier to the AS;

S406, after the AS executes the service process logic, it copies the trigger request identifier into the dialog establishment request message to be sent back;

If the AS determines that there are several dialog establishment request messages to be sent back based on the service logic, each request message to be sent back has the same trigger request identifier, which means that they are the responses of the dialog establishment request messages sent by the S-CSCF module.

S407, the AS sends the dialog establishment request message including the trigger request identifier back to the S-CSCF module;

S408, the S-CSCF module determines that the dialog establishment request sent back is the response to the dialog establishment request message sent to the AS by the S-CSCF previously according to the trigger request identifier in the dialog establishment request message sent back, and determines its corresponding dialog establishment request sent to the AS by the S-CSCF and the original dialog corresponding to the dialog establishment request according to the corresponding relationship established in S403.

If there are several dialog establishment request messages sent back in S406, in other words, there are several call processes, the AS is responsible for maintaining the relationship among several branches while the S-CSCF processes each branch respectively, and during processing, the S-CSCF module determines that they are responses of the same dialog establishment request message in one session process according to the same trigger request identifier in the dialog establishment request message, and executes the subsequent service control following the triggering point of the previous dialog establishment request message.

S409, the S-CSCF continues to execute the subsequent service control logic and matches the dialog establishment request sent back with the subsequent filter criteria with relatively low priorities. If there is matching initial filter criteria, it re-executes the service triggering process S403, and uses a newly generated trigger request identifier to identify this trigger request;

S410, if there are no suitable initial filter criteria, the S-CSCF module sends the call-out request based on the route policy.

The process of the standalone transaction request message (such as Message service) is similar, and the only difference is that the standalone transaction request does not establish the SIP dialog.

Figure 5:
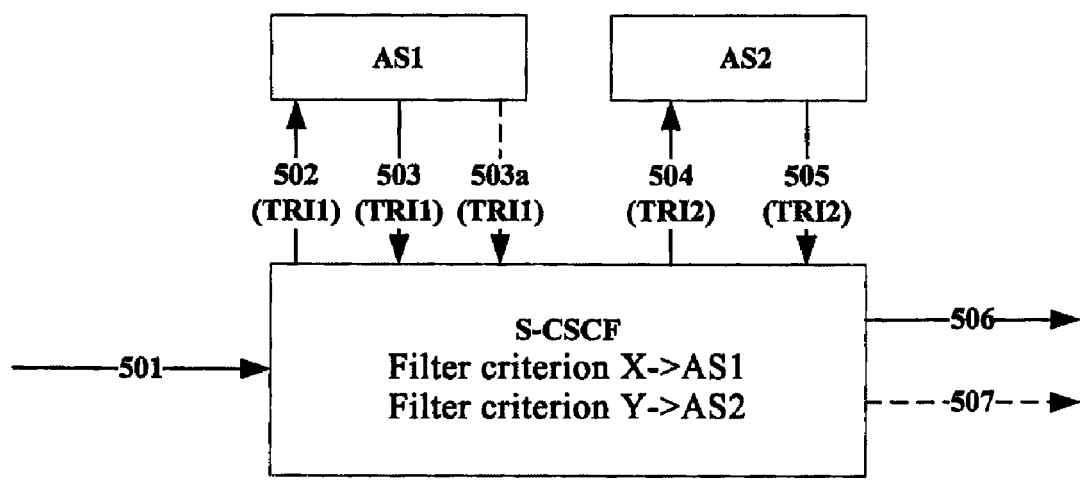
FIG. 5 is a flow chart of service triggering process when the AS sends several initial request messages back in accordance with an embodiment of the present invention.

FIG. 5 describes the process when the AS sends several initial request message back for one initial trigger request message after applying the improved technology.

In the present embodiment, there are two initial filter criteria: the criterion X pointing to AS1 and Y pointing to AS2, and the priority of X is higher than that of Y. According to the service application logic, the call-in initial request matches with the criterion X, thus trigger AS1 and AS1 sends two initial request messages back, and message 1 matches with criterion Y, while the message 2 does not, and the service triggering process comprises the following steps:

S1, the S-CSCF module receives a call-in dialog establishment request 501, and starts a SIP dialog;

S2, the S-CSCF module executes the service control logic, finds out that the request message 501 matches with the original filter criterion X, executes the service triggering process, generates the triggering request identifier Trigger Request Identifier (TRI1), such as TRI1="12345", inserts TRI1 into the dialog establishment request message and forwards the request message 502 to AS1;

S3, after AS1 executes the service processing logic, it determines to send two dialog establishment request messages 503 and 503a back to the S-CSCF module, copies TRI1 into the two dialog establishment request messages 503 and 503a, and sends the two request messages back to the S-CSCF module;

S4, the S-CSCF module processes the dialog establishment request message sent back 503 first, determines that the request is the response to the dialog establishment request message 502 sent by the S-CSCF module according to TRI1 in the request message sent back, and corresponds to the SIP dialog started in S1, it continues to execute the subsequent service control logic of the SIP dialog after the filter criterion X, finds out that the request message matches with the original filter criterion Y, executes the service triggering process, generates the new trigger request identifier TRI2, such as TRI2="54321", and different from TRI1, it inserts TRI2 into the request message and forwards the request message 504 to AS2;

The S-CSCF module then processes the request message sent back 503a, and in a similar way, determines that the request is the response to request message 502 sent by the S-CSCF according to TRI1 in the request message sent back, and corresponds to the SIP dialog started in S1, it executes the subsequent service control logic of the SIP dialog after the filter criterion X, finds out that the request message does not match with the initial filter criterion Y, and then the S-CSCF module sends the call-out request 507 out based on the route policy;

S5, after AS2 executes the service process logic, it copies TRI2 into the dialog establishment request message sent back and sends request message 505 back to the S-CSCF module;

S6, the S-CSCF module determines that the request is the response to the request message 504 sent by the S-CSCF module according to TRI2 in the request message sent back, and corresponds to the SIP dialog started in step 1, it finds out that there is no suitable initial filter criteria, and sends the call-out request 506 based on the route policy.

From the above process, it can be seen that with the method of the present invention, it avoids the confusion in the triggering process and guarantees the normal implementation of the service.

Of course that the present invention may have several other embodiments, and without departing from the spirit and essence of the present invention, those skilled in the art can make all kinds of modification or variations according to the present invention which all should belong to the scope of the claims of the present invention.

INDUSTRIAL APPLICABILITY

By applying the method of the present invention into the IMS service triggering control process, the S-CSCF uses the TRI to uniquely identify the initial request message sent to the AS by the S-CSCF, thus correctly matches the initial request message sent to the AS by the S-CSCF with that sent back from the AS, thereby the normal performance of service triggering and the normal use of services are guaranteed.

What we claim is:

1. A method for matching initial request messages in a service triggering process in an internet protocol multimedia core network subsystem, comprising the following steps of:

A. in a process of executing a service triggering, before a Serving Call Session Control Function (S-CSCF) module forwards an initial request message to an Application Server (AS), the S-CSCF module generating a trigger request identifier uniquely corresponding to said initial request message;

B. said S-CSCF module inserting said trigger request identifier into said initial request message, and forwarding said initial request message to said AS;

C. after processing, said AS copying the trigger request identifier in the received request message, and sending a second initial request message including the copied trigger request identifier back to said S-CSCF module; and D. said S-CSCF module determining that said second initial request message is a returned message of the initial request message sent to the AS by the S-CSCF module previously according to the trigger request identifier in the received second initial request message, determining the initial request message sent to the AS by the S-CSCF module corresponding to the trigger request identifier and an original dialog or original transaction corresponding to the initial request message, and then performing a subsequent service control process.

2. A method of claim 1, wherein said initial request message is a dialog establishment request message or a standalone transaction request message.

3. A method of claim 2, wherein,
said initial request message is the dialog establishment request message; and
in addition to generating the trigger request identifier uniquely corresponding to said dialog establishment request message, said step A further comprises establishing a corresponding relationship between the trigger request identifier and the dialog establishment request message as well as between the trigger request identifier and an original dialog corresponding to said dialog establishment request message.

4. A method of claim 3, wherein in said step A, the trigger request identifier established by the S-CSCF module is unique, which means different original dialogs have different trigger request identifiers, and in different service triggering processes of a same original dialog, identifiers corresponding to initial request message sent by the S-CSCF module to the AS are different.

5. A method of claim 3, wherein in said step C, the AS has a plurality of second initial request messages to be sent back; and in said step D, the S-CSCF module determines that the second initial request messages are responses to a same initial request message in one session according to a same trigger request identifier contained in the initial request messages, and always executes a subsequent service control after a triggering point of a previous initial request message.

6. A method of claim 5, further comprising:
when continuing to execute a subsequent service control logic, said S-CSCF module matching said second initial request message sent back with subsequent filter criteria with relatively low priorities, and if there is a matching initial filter criterion, executing a process of the service triggering in step A again, and identifying the initial request message with a newly generated trigger request identifier; and if there is no suitable initial filter criterion, then said S-CSCF module sending a call-out request based on a routing policy.

7. A method of claim 2, wherein,
said initial request message is the standalone transaction request message; and
in addition to generating the trigger request identifier uniquely corresponding to said standalone transaction request message, said step A further comprises establishing a corresponding relationship between the trigger request identifier and the standalone transaction request message as well as between the trigger request identifier and an original transaction corresponding to said standalone transaction request message.

8. A method of claim 7, wherein in said step A, the trigger request identifier established by the S-CSCF module is unique, which means different original transaction requests have different trigger request identifiers, and in different service triggering processes of a same original transaction, identifiers corresponding to initial request messages sent by the S-CSCF module to the AS are different.

9. A method of claim 7, wherein in said step C, the AS has a plurality of second initial request messages to be sent back; and in said step D, the S-CSCF module determines that the second initial request messages are responses to a same initial request message in one transaction process according to a same trigger request identifier contained in the initial request messages, and always executes a subsequent service control after a triggering point of a previous initial request message.

10. A method of claim 9, further comprising:
when continuing to execute a subsequent service control logic, said S-CSCF module matching said second initial request message sent back with subsequent filter criteria with relatively low priorities, and if there is a matching initial filter criterion, executing a process of the service triggering in step A again, and identifying the initial request message with a newly generated trigger request identifier; and if there is no suitable initial filter criterion, then said S-CSCF module sending a call-out request based on a routing policy.

11. A method of claim 2, wherein in said step A, the trigger request identifier established by the S-CSCF module is unique, which means different original dialogs or original transaction requests have different trigger request identifiers, and in different service triggering processes of a same original dialog or transaction, identifiers corresponding to initial request messages sent by the S-CSCF module to the AS are different.

12. A method of claim 2, wherein in said step A, the generated trigger request identifier is an identifier to be applied individually formed by extending the identifier of the original dialog; alternatively, said trigger request identifier is a combination of the original dialog identifier and trigger request parameters added on a basis of said original dialog identifier, so as to determine the original dialog or transaction of the request according to said original dialog identifier and further to determine a specific request message of the initial request sent to the AS by the S-CSCF module according to said trigger request parameters.

13. A method of claim 2, wherein in step C, the AS has a plurality of second initial request messages to be sent back; and in said step D, the S-CSCF module determines that the second initial request messages are responses to a same initial request message in one session or transaction process according to a same trigger request identifier contained in the initial request messages, and always executes a subsequent service control after a triggering point of a previous initial request message.

14. A method of claim 13, further comprising:
when continuing to execute a subsequent service control logic, said S-CSCF module matching said second initial request message sent back with subsequent filter criteria with relatively low priorities, and if there is a matching initial filter criterion, executing a process of the service triggering in step A again, and identifying the initial request message with a newly generated trigger request identifier; and if there is no suitable initial filter criterion, then said S-CSCF module sending a call-out request based on a routing policy.

15. A method of claim 1, wherein in said step A, said trigger request identifier is a character string of a user part, a parameter or a port number of a network identifier of the S-CSCF module.

16. A method of claim 1, wherein in said step C, the AS has a plurality of second initial request messages to be sent back; and in said step D, the S-CSCF module determines that the second initial request messages are responses to a same initial request message in one session or transaction process according to a same trigger request identifier contained in the initial request messages, and always executes a subsequent service control after a triggering point of a previous initial request message.

17. A method of claim 16, further comprising:

when continuing to execute a subsequent service control logic, said S-CSCF module matching said second initial request messages sent back with subsequent filter criteria with relatively low priorities, and if there is a matching initial filter criterion, executing a process of the service triggering in step A again, and identifying the initial request message with a newly generated trigger request identifier; and if there is no suitable initial filter criterion, then said S-CSCF module sending a call-out request based on a routing policy.

* * * * *